United States Patent
Yamazaki et al.

(10) Patent No.: US 12,449,602 B2
(45) Date of Patent: Oct. 21, 2025

(54) MULTIMODE SPLITTER FOR NARROWING INPUT WIDTH PHOTODETECTOR CONNECTIONS

(71) Applicant: MACOM Technology Solutions Holdings, Inc., Lowell, MA (US)

(72) Inventors: Hiroyuki Yamazaki, Allentown, PA (US); Haike Zhu, Allentown, PA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/165,546

(22) Filed: Feb. 2, 2021

(65) Prior Publication Data

US 2022/0244464 A1 Aug. 4, 2022

(51) Int. Cl.
*G02B 6/12* (2006.01)
*G02B 6/28* (2006.01)
(Continued)

(52) U.S. Cl.
CPC ....... *G02B 6/2938* (2013.01); *G02B 6/12004* (2013.01); *G02B 6/12019* (2013.01); *G02B 6/2813* (2013.01); *G02B 6/4213* (2013.01); *G02B 6/4215* (2013.01); *G02B 6/14* (2013.01); *G02B 6/30* (2013.01)

(58) Field of Classification Search
CPC .. G02B 6/12004; G02B 6/12019; G02B 6/14; G02B 6/2813; G02B 6/2938; G02B 6/30
See application file for complete search history.

(56) References Cited

U.S. PATENT DOCUMENTS

| | | | |
|---|---|---|---|
| 6,356,692 B1 * | 3/2002 | Ido | G02B 6/12007 385/129 |
| 6,856,733 B2 * | 2/2005 | Zheng | G02B 6/42 385/39 |

(Continued)

FOREIGN PATENT DOCUMENTS

CN 101308233 A * 11/2008

OTHER PUBLICATIONS

Yoshiyuki Doi, et al., "Compact High-Responsivity Receiver Optical Subassembly With a Multimode-Output-Arrayed Waveguide Grating for 100-GB/s Ethernet", Journal of Lightwave Technology, vol. 33, No. 15, Aug. 2015; 7 pages.

(Continued)

*Primary Examiner* — Ryan A Lepisto
(74) *Attorney, Agent, or Firm* — Faegre Drinker Biddle & Reath LLP (57) ABSTRACT

Systems and methods for implementing a multimode splitting structure that divides a multimode wide waveguide into multiple narrower waveguides for photodetector connections in an optoelectronic system are disclosed. The optoelectronic system includes an optical filter, a multimode splitter, and a plurality of photodetector. The optical filter is communicatively coupled to a first waveguide to receive an optical signal and configured to demultiplex the optical signal onto a plurality of second waveguides based on different wavelengths. The multimode splitter is adapted to divide each of the plurality of second waveguides into a plurality of third waveguides. Each of the plurality of photodetector is adapted to be connected to each of the plurality of the third waveguide.

18 Claims, 7 Drawing Sheets

(51) Int. Cl.
G02B 6/293 (2006.01)
G02B 6/42 (2006.01)
G02B 6/14 (2006.01)
G02B 6/30 (2006.01)

(56) References Cited

U.S. PATENT DOCUMENTS

| | | | | |
|---|---|---|---|---|
| 8,606,120 | B2* | 12/2013 | Ziari | G02F 1/3136 |
| | | | | 398/213 |
| 9,020,367 | B2* | 4/2015 | Jones | H04B 10/65 |
| | | | | 398/214 |
| 9,081,214 | B2* | 7/2015 | Oikawa | G02F 1/225 |
| 9,128,347 | B2* | 9/2015 | Kato | G02F 1/225 |
| 9,164,237 | B2* | 10/2015 | Onishi | G02B 6/12004 |
| 9,306,670 | B2* | 4/2016 | Fujiwara | G02B 6/2808 |
| 10,295,744 | B2* | 5/2019 | Kamei | G02B 6/00 |
| 10,627,849 | B1* | 4/2020 | Scofield | G06N 3/0445 |
| 2011/0064422 | A1* | 3/2011 | Kim | H04B 10/614 |
| | | | | 398/214 |
| 2014/0199065 | A1* | 7/2014 | Bratkovski | H04J 14/04 |
| | | | | 398/44 |
| 2020/0319409 | A1* | 10/2020 | Su | H04J 14/0209 |

OTHER PUBLICATIONS

Leopold Virot, et al., "Integrated waveguide PIN photodiodes exploiting lateral exploiting lateral Si/Ge/Si heterojunction", Optics Express Research Article, vol. 25, No. 16, Aug. 7, 2017; 10 pages.

* cited by examiner

MULTIMODE SPLITTER FOR NARROWING INPUT WIDTH PHOTODETECTOR CONNECTIONS

TECHNICAL FIELD

The present disclosure relates to the field of semiconductor technology and, more specifically, describes a multimode splitting structure that divides a multimode wide waveguide into narrower waveguides for photodetector connections in an optoelectronic system.

BACKGROUND

An optical filter is widely used in optical communication system and is one of the key components for Wavelength Division Multiplexing (WDM) system. Recently, WDM is introduced in access and datacom network systems in order to respond to a huge demand for high speed network. There is a need for a smaller module size as well as a smaller optical functional chip in access and datacom system.

SUMMARY

As set forth above, embodiments provided herein relate to a multimode splitting structure that divides a multimode wide waveguide into narrower waveguides for photodetector connections in an optoelectronic system. Exemplary embodiments include but are not limited to the following examples.

In an exemplary embodiment of the present disclosure, an optoelectronic system is provided. The optoelectronic system includes an optical filter, a multimode splitter, and a plurality of photodetector. The optical filter is communicatively coupled to a first waveguide to receive an optical signal and is configured to demultiplex the optical signal onto a plurality of second waveguides based on different wavelengths. Each of the second waveguides has a second width. The multimode splitter is adapted to divide each of the plurality of second waveguides into a plurality of third waveguides. Each of the third waveguides has a third width different than the second width. Each of the plurality of photodetector is adapted to be connected to each of the plurality of the third waveguide.

In some embodiments, the third width may be smaller than the second width.

In some embodiments, a total width of the plurality of the third waveguides may be substantially similar to the second width.

In some embodiments, an optical mode of the second waveguide may be multimode, and/or an optical mode of the third waveguide may be multimode.

In some embodiments, the optoelectronic system may further include the photodetector and a controller. The photodetector may be configured to convert optical signal propagating along the respective third waveguide to an electrical signal. The controller may be configured to receive the electrical signal to generate an output signal.

In some embodiments, the second waveguide may be made of silicon, indium phosphide (InP), and/or silica, and the photodetector may be implemented on silicon, indium phosphide (InP), and/or silica.

In some embodiments, the optoelectronic system may further include a polarization splitter configured to split the optical signal propagating along the first waveguide into a first transverse electrical (TE) optical signal and a transverse magnetic (TM) optical signal.

In some embodiments, the optoelectronic system may further include a polarization rotator configured to convert the TM optical signal to a second TE optical signal.

In another exemplary embodiment of the present disclosure, a method for transmitting optical signals is provided. The method includes receiving, by an optical filter, an optical signal from a first waveguide, demultiplexing, by the optical filter, the optical signal onto a plurality of second waveguides based on different wavelengths, each of the second waveguides having a second width, and splitting, by a multimode splitter, a signal propagating along the second waveguide into a plurality of third waveguides, each of the third waveguides having a third width different than the second width and coupled to a photodetector.

In some embodiments, the third width may be smaller than the second width.

In some embodiments, a total width of the plurality of the third waveguides may be substantially similar to the second width.

In some embodiments, an optical mode of the second waveguide may be multimode, and/or an optical mode of the third waveguide may be multimode.

In some embodiments, the method may further include converting, by the photodetector, a signal propagating along the third waveguide to an electrical signal, transmitting, by the photodetector, the electrical signal to a controller, and generating, by the controller, an output signal.

In some embodiments, generating the output signal may include combining, by the controller, one or more electrical signals from a plurality of photodetectors that are coupled to the plurality of third waveguides.

In some embodiments, the optical signal may include a number of optical carrier signals that have been multiplexed onto the first waveguide by using different wavelengths.

In some embodiments, the multimode splitter may be configured to divide each of the plurality of second waveguides into the plurality of third waveguides for photodetector connections.

In some embodiments, the second waveguide may be made of silicon, indium phosphide (InP), and/or silica, and the photodetector may be implemented on silicon, indium phosphide (InP), and/or silica.

In some embodiments, the photodetector may be embodied as one or more waveguide photo-diodes (PD).

In some embodiments, the method may further include splitting, by a polarization splitter, the optical signal propagating along the first waveguide into a first transverse electrical (TE) optical signal and a transverse magnetic (TM) optical signal.

In some embodiments, the method may further include converting, by a polarization rotator, the TM optical signal to a second TE optical signal While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE DRAWINGS

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present disclosure generally relates to a multimode splitting structure that divides a multimode wide waveguide into narrower waveguides to reduce an input width for photodetector connections in optical communication systems. This reduces excess loss in arrayed waveguide gratings (AWG) and Echelle gratings in wavelength division multiplexed (WDM) systems.

Recently, WDM is introduced in access and datacom network systems in order to respond to a huge demand for high speed network. Having a small module size and a small optical functional chip are desired in access and datacom network systems. Silicon (Si) photonics may be used to reduce the optical chip size due to strong optical confinement. Moreover, many optical functions, such as optical branching, modulator, photo-detection and optical filtering, and their integration are possible by using Si photonics.

Generally, Coarse Wavelength Division Multiplexing (CWDM4) system is standardized and is widely used. Silica-based AWG is widely used in CWDM4 system because it has a sufficient wide passband width and cross talk characteristics. However, integration of the silica-based AWG to Si photonics is challenging, which leads to a larger module size.

In WDM systems, multiple wavelengths are used to expand information capability. Specifically, the optical filtering is one of important functions for the WDM system. In Si photonics, optical filtering function and photo detector are typically integrated in a semiconductor chip. However, a photodetector at the receiver end of the optical communication system, such as a waveguide photo-diode (PD) with lateral PIN junction that has high sensitivity and high speed response, typically has a sub-micron input waveguide width. To narrow the width of a multimode wide waveguide from several micron to submicron, width tapered waveguides may be used. However, due to prohibited propagation of higher order mode, severe excess loss is present in the width tapered waveguides. Hence, there remains a need to develop an efficient splitting structure to narrow a multimode wide waveguide to a sub-micron width waveguide photo-diode (PD) in Si photonics application.

Accordingly, in various embodiments, an optoelectronic system that has a multimode splitter is described. Further, the multimode splitter improves overall waveguide splitting and coupling efficiency, which leads to low excess loss. Unlike a width tapered waveguide, a multimode wide waveguide with a multimode splitter is compatible with silicon (Si) microelectronics facilities, chip-scale device miniaturization, and large-scale integration.

Figure 1:
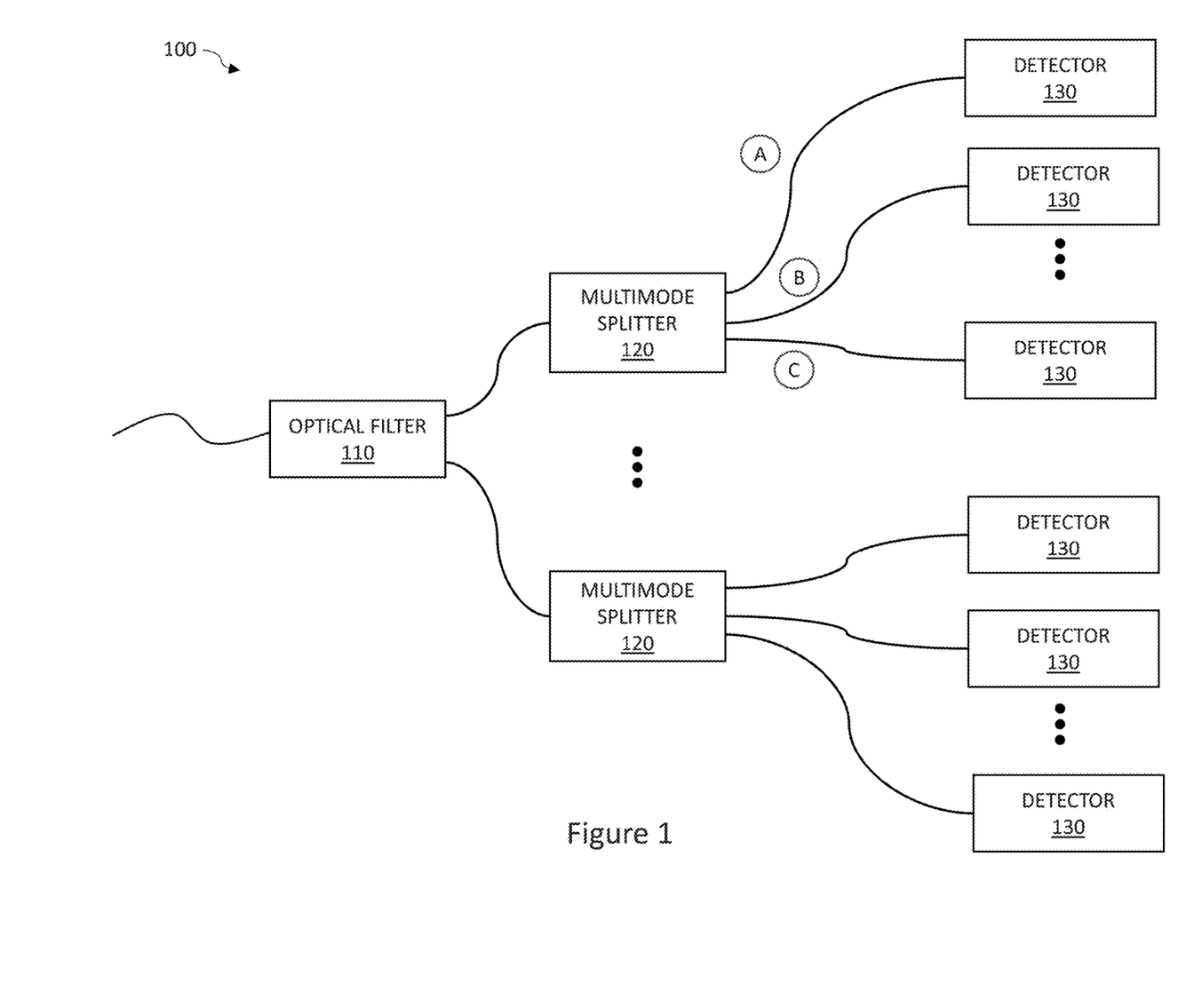
FIG. 1 is a schematic diagram of an optoelectronic system including a multimode splitter in accordance with various embodiments of the present disclosure.

Referring now to FIG. 1, a schematic diagram of an optoelectronic system 100 is shown. The optoelectronic system 100 may include an optical filter 110, one or more multimode splitters 120, and one or more detectors 130. In fiber-optic communications, a wavelength-division multiplexing (WDM) system may employ an optical multiplexer to combine different wavelength channels into a composite input signal. To do so, the WDM system may multiplex a number of optical carrier signals onto a single optical waveguide (e.g., optical fiber) by using different wavelengths. In such embodiment, the composite input signal, which includes several input channels with different wavelengths, propagates via the optical waveguide and passes through the optical filter 110.

The optical filter 110 is configured to demultiplex the input signal into different multimode waveguides based on different wavelengths. By doing so, the optical filter 110 may selectively filter the input signal into filtered optical signals based on different wavelengths. The optical filter 110 may include, but not limited to, an Arrayed-Waveguide Grating (AWG) filter, an Echelle grating filter, and/or a Multi-stage asymmetric Mach-Zehnder interferometer. For example, the Echelle grating filter may be used because of its smaller module size. good compatibility to Si photonics, and flat passband characteristics. However, it should be appreciated that the optical filter 110 may be embodied as any device that can selectively transmit light of different wavelengths and has low excess loss, flat and wide passband width, and low cross-talk characteristics.

Figure 5A:
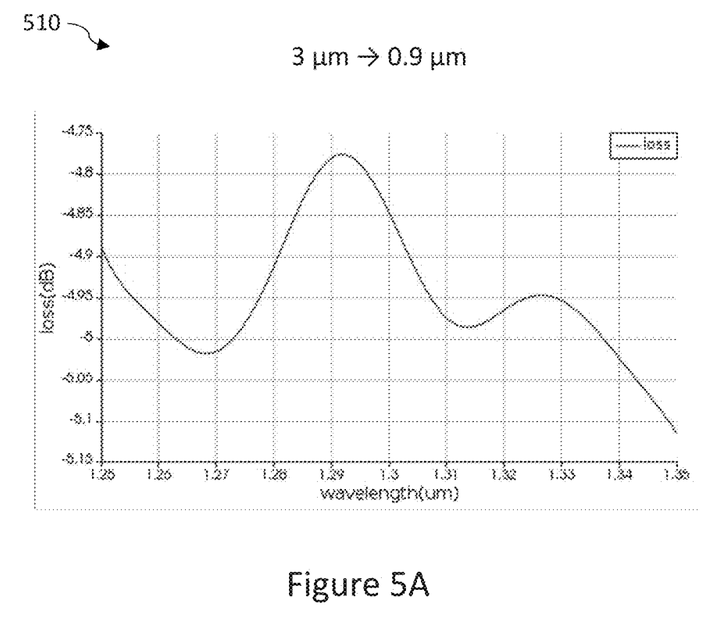
FIGS. 5A and 5B are graphs illustrating calculated excess losses of a multimode taper structure waveguide using a three-dimensional finite-difference time-domain (3D FDTD) analysis technique.
Figure 5B:
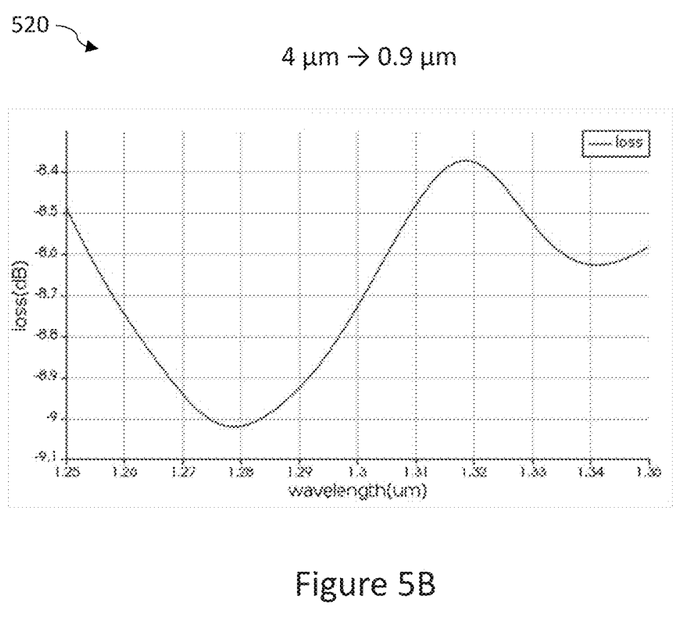

The multimode optical splitter 120 is adapted to divide the multimode wide waveguide into a plurality of narrower waveguides. Each of the plurality of narrower waveguides are adapted to be connected to its respective detector 130. In Si photonics, a lateral PN junction waveguide photo-diode (PD) is widely used as a photodetector (e.g., the detector 130) because of it has high speed response, efficient responsibility, and superior reliability. In the illustrative embodiment, the waveguide PD has a width approximately 0.9 μm for balancing responsibility and high speed response. On the other hand, a wider multimode waveguide width is generally needed for Echelle grating multiplexer. The challenge wises when connecting the wide multimode waveguide to a narrower 0.9 µm width waveguide PD. In a single mode waveguide, width tapered waveguide structures have been widely used. However, using a tapered waveguide structure to narrow a multimode waveguide to a narrower waveguide results a greater excess loss. For example, as shown in FIG. 5A, more than 4.5 dB excess loss was observed when using a width tapered waveguide structure with approximately 50 µm in length to reduce a width of waveguide from 3 µm to 0.9 µm in order to match the width of the waveguide PD. Similarly, as shown in FIG. 5B, more than 8 dB excess loss was observed when using the width tapered waveguide structure with approximately 50 µm in length to reduce the width of waveguide from 4 µm to 0.9 µm in order to match the width of the waveguide PD. Accordingly, to reduce the amount of excess loss, the optoelectronic system 100 includes the multimode optical splitter 120 to divide the multimode wide waveguide into a plurality of narrower waveguide, wherein each of the narrower waveguide has a substantially similar width as the width of the waveguide PD.

Figure 3:
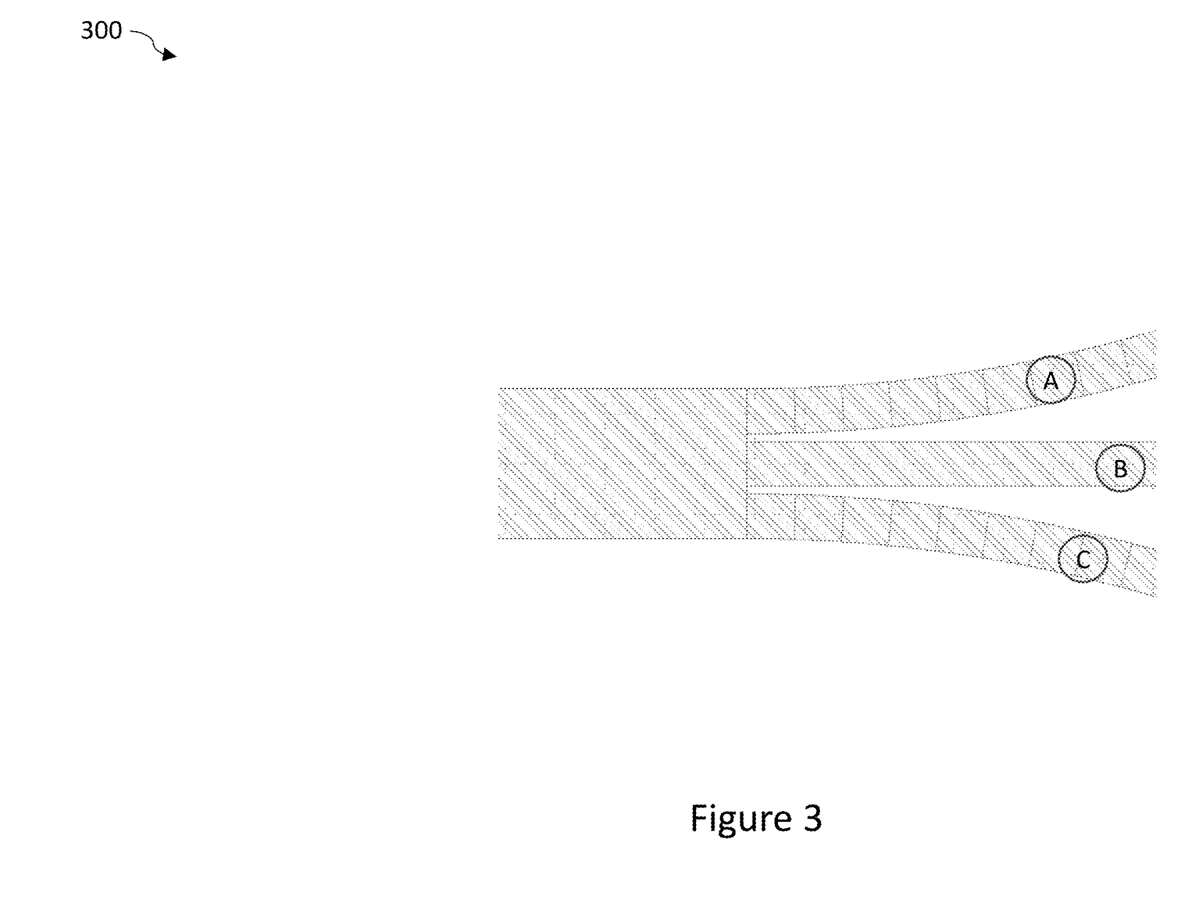
FIG. 3 is a schematic diagram of a 1×3 multimode splitter.
Figure 4:
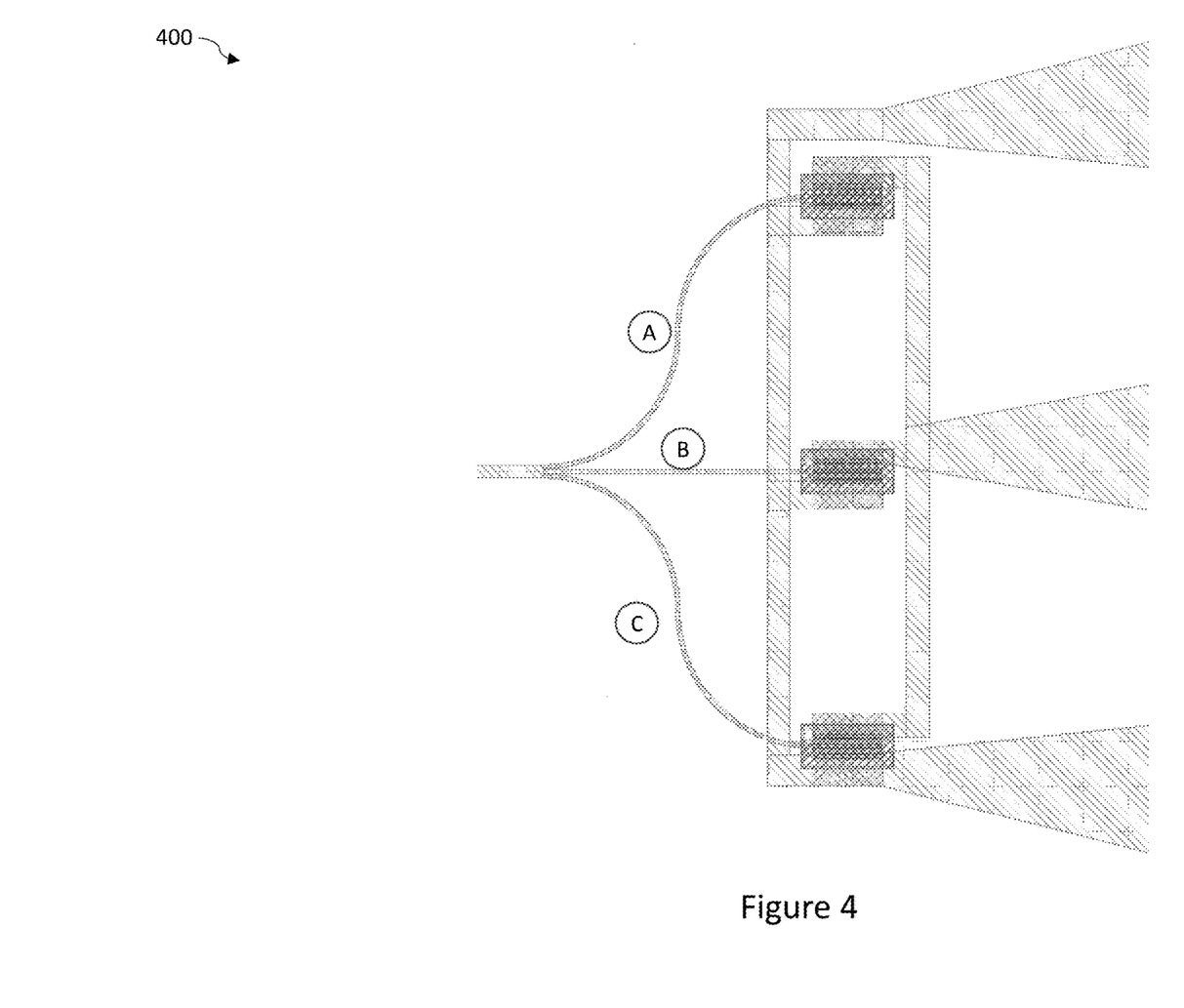
FIG. 4 is a schematic diagram of the 1×3 multimode splitter of FIG. 3 and its respective photodetector.

The multimode splitter 120 is configured to split the filtered input signals propagating along the multimode wide waveguide into the plurality of narrower waveguides. Specifically, the narrower waveguides are directly connected to the multimode wide waveguide, and each narrower waveguide has a width smaller than the width of the multimode wide waveguide, as illustrated in FIGS. 3 and 4. In the illustrative embodiment, the gaps between the narrower waveguides at a splitting part (i.e., a portion where the multimode wide waveguide is divided into the narrower waveguides) are very small, such that the total width of the narrower waveguides is substantially similar to the width of the multimode wide waveguide to achieve a good mode matching. This allows the narrower waveguides to capture as much signals coming from the multimode wide waveguide (i.e., all light that enter through the multimode splitter 120) as possible. The larger gap between each narrower waveguide at the splitting part may result bigger splitting loss and wavelength dependence.

It should be appreciated that the splitting ratio of the signals coming from the multimode wide waveguide into the narrower waveguides depends on the original optical modes in the multimode wide waveguide. In some embodiments, the width of each narrower waveguides may be even different. However, having the total width of the narrower waveguides substantially similar to the width of the multimode wide waveguide allows the narrower waveguides to transit the signals coming from the multimode wide waveguide into the detector 130 (also known as a waveguide photodetector).

The multimode splitter 120 is configured to split the multimode wide waveguide into any appropriate number of smaller waveguides (e.g., 1×n multimode splitter). For example, the multimode splitter 120 shown in FIG. 3 illustrates a 1×3 multimode splitter that is capable of splitting a multimode wide waveguide into three separate narrower waveguides A, B, and C. In the illustrative embodiment, the multimode waveguide has a 3.0 µm width or diameter, which is divided into three narrower waveguides A, B, and C with a gap between the narrower waveguides. Each narrower waveguide A, B, and C has a diameter of 0.9 µm, and each gap is 0.15 µm.

Figure 6:
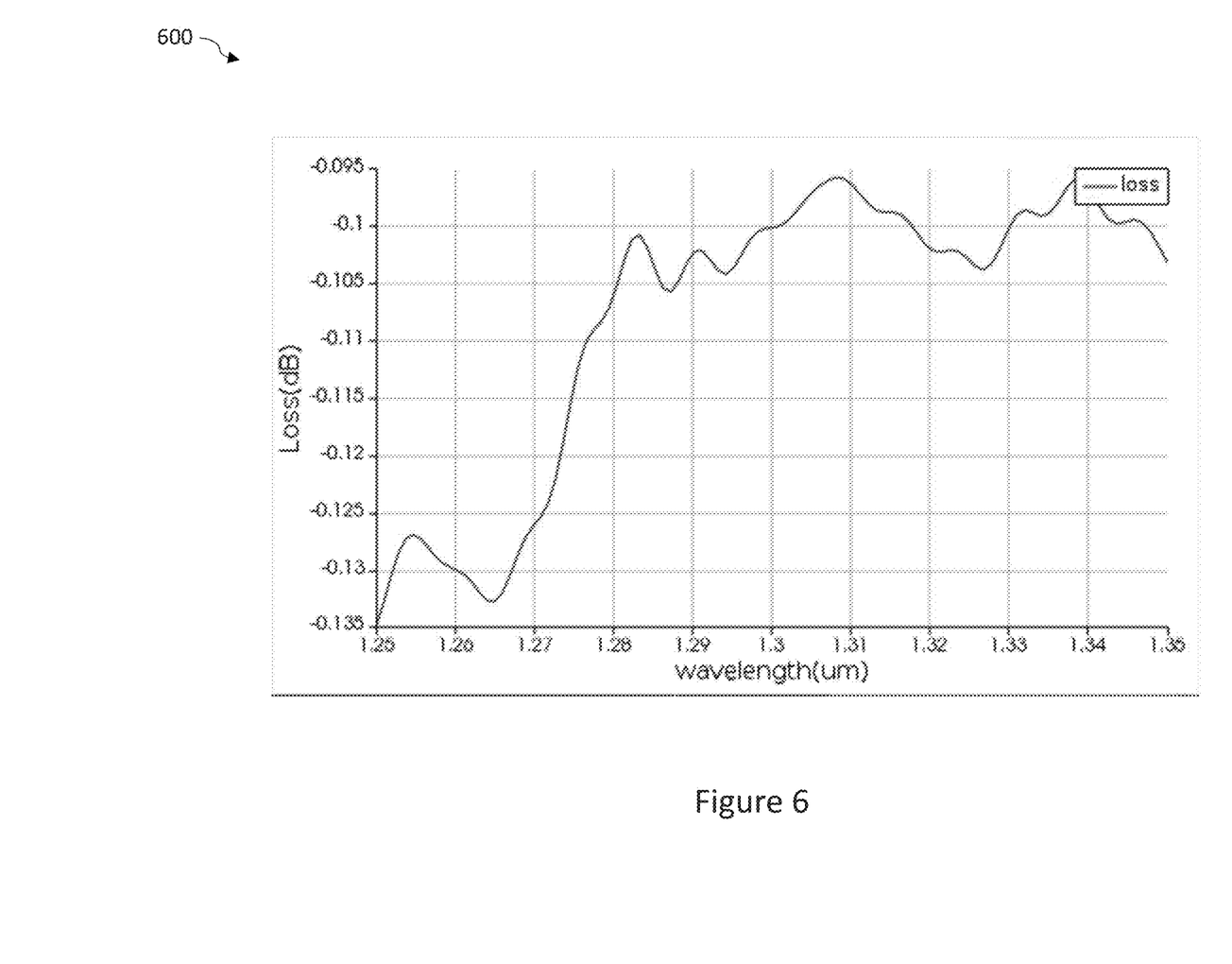
FIG. 6 is a graph illustrating a calculated excess loss of the 1×3 multimode splitter by using a 3D FDTD analysis technique.

As shown in FIG. 6, a three-dimensional finite-difference time-domain (3D FDTD) analysis technique was used to calculate excess loss, and the excess loss of such 1×3 multimode splitter is less than 0.15 dB over a wide wavelength range. This is significantly lower than the excess loss of a width tapered waveguide structure (FIGS. 5A and 5B). In other words, the multimode optical splitter enables low excess loss in optical filter by narrowing multimode wide waveguide to sub-micron width waveguide PD.

It should be appreciated that the multimode splitter 120 may be implemented not only with silicon (Si) waveguide, but also with indium phosphide (InP), silica, and/or other waveguide material. In the illustrative embodiment, the optical mode in the narrower waveguide is multimode, and the narrower waveguides are made of the same material as the multimode wide waveguide to avoid reflection. However, in some embodiments, the narrower waveguide may be embodied as a single-mode optical fiber and may be made of materials different than the multimode wide waveguide.

As described above, each narrower waveguide is coupled to the detector 130, which detects light intensity variations of the optical signal propagating along the respective narrower waveguide. The detector 130 may be implemented on silicon (Si), germanium (Ge), any other suitable substrates, and/or any combination thereof. Each detector 130 is configured to convert optical signals propagating along the corresponding waveguide to electrical signals. In the illustrative embodiment, the detector 130 is embodied as waveguide photo-diodes (PD) implemented on silicon, and the waveguide PD uses a PIN junction to increase the speed of response. In some embodiments, the optoelectronic system 100 may further include a controller, which is configured to combine the electrical signals from the one or more detectors 130 to generate an output signal.

Referring now to FIG. 3, as described above, the 1×3 multimode splitter that is capable of splitting a multimode wide waveguide into three separate narrower waveguides A, B, and C is shown. Each separate narrower waveguides A, B, C is connected to a waveguide photo-diodes (PD), as illustrated in FIG. 4. In the illustrative embodiment, the multimode waveguide has a 3.0 µm width or diameter, which is divided into three narrower waveguides with a gap between the narrower waveguides. Each narrower waveguide has a diameter of 0.9 µm, and each the gap is 0.15 µm. Each narrower waveguide A, B, C is connected to the waveguide PD that has the same width as the narrower waveguide. It should be noted that the widths of the waveguides and the gaps between the narrower waveguides in FIGS. 3 and 4 are not drawn to scale.

Figure 2:
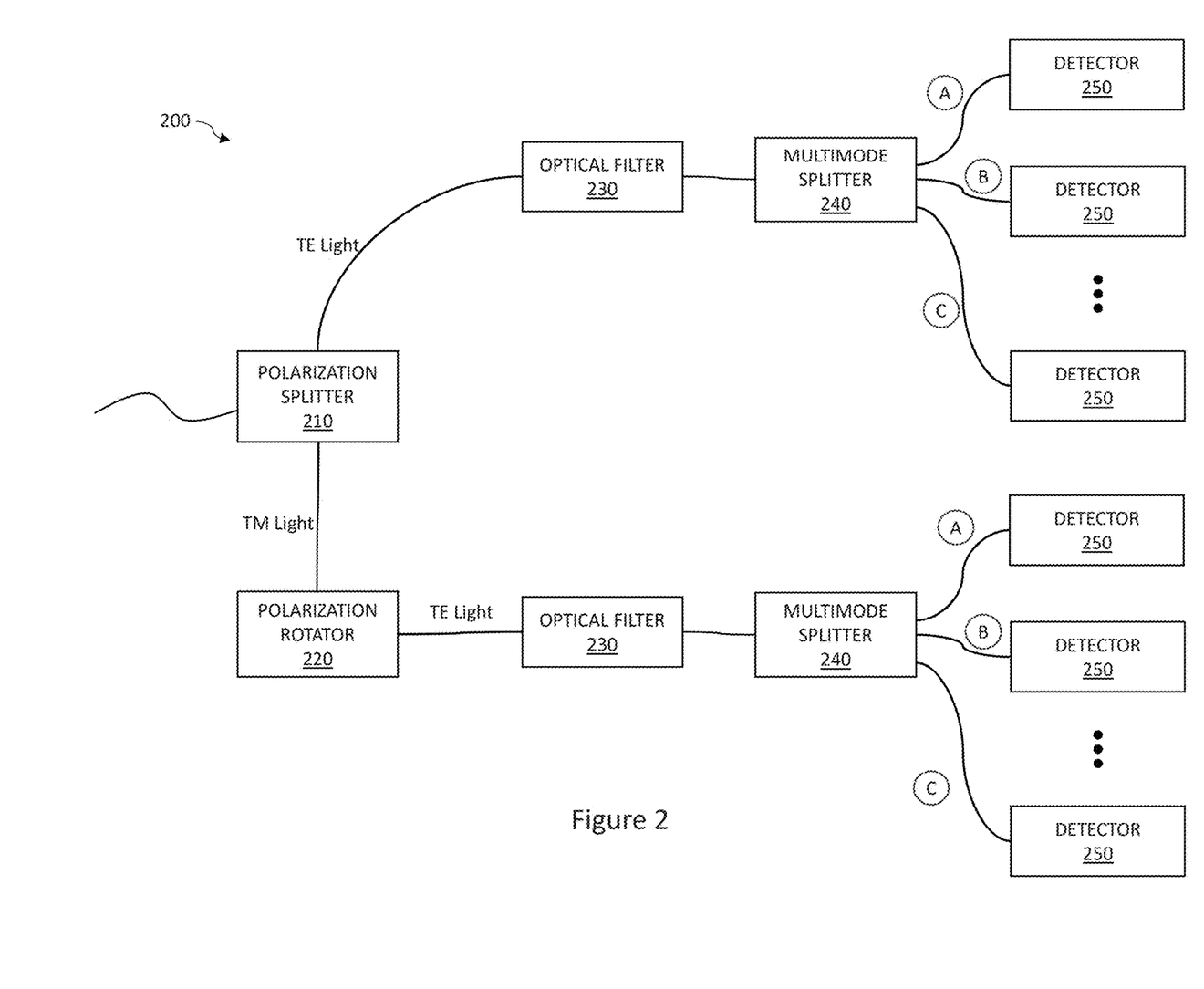
FIG. 2 is a schematic diagram of an optoelectronic, system including a polarization splitter and a multimode splitter in accordance with various embodiments of the present disclosure.

Referring now to FIG. 2, a schematic diagram of an optoelectronic system 200 is shown. The optoelectronic system 200 may include a polarization splitter 210, a polarization rotator 220, optical filters 230, multimode splitters 240, and detectors 250.

The polarization splitter 210 is configured to split an optical signal propagating along the multimode wide waveguide into separate optical signals based upon its propagation mode. Depending on the material of the waveguide, the waveguide may support more than one propagation mode for a given optical frequency and thus different optical field distributions during propagation. The propagation mode includes a transverse electric (TE) mode and a transverse magnetic (TM) mode. Specifically, in the illustrative embodiment, the polarization splitter 210 splits the optical signal into a transverse electrical (TE) optical signal and a transverse magnetic (TM) optical signal. This allows photodetectors to capture optical signals in different propagating modes.

Subsequently, the TM optical signal is received by the polarization rotator 220, which converts the propagation mode of the TM optical signal to a TE optical signal. The TE optical signal is received by its respective optical filter 230, similar to the optical filter 110. The optical filter 230 is configured to demultiplex the input signal into different multimode waveguides based on different wavelengths. By doing so, the optical filter 230 may selectively filter the input signal into filtered optical signals based on different wavelengths. The optical filter 230 may include, but not limited to, an Arrayed-Waveguide Grating (AWG) filter, an Echelle grating filter, and/or a Multi-stage asymmetric Mach-Zehnder interferometer. For example, the Echelle grating filter may be used because of its smaller module size. good compatibility to Si photonics, and flat passband characteristics. However, it should be appreciated that the optical filter 230 may be embodied as any device that can selectively transmit light of different wavelengths and has low excess loss, flat and wide passband width, and low cross-talk characteristics.

The multimode optical splitter 240 is similar to the multimode optical splitter 120 of the optoelectronic system 100. The multimode optical splitter 240 is adapted to divide the multimode wide waveguide into a plurality of narrower waveguides. Each of the plurality of narrower waveguides are adapted to be connected to its respective detector 250.

The multimode optical splitter 240 is configured to split the filtered input signals propagating along the multimode wide waveguide into the plurality of narrower waveguides. Specifically, the narrower waveguides are directly connected to the multimode wide waveguide, and each narrower waveguide has a width smaller than the width of the multimode wide waveguide. In the illustrative embodiment, the gaps between the narrower waveguides at a splitting part (i.e., a portion where the multimode wide waveguide is divided into the narrower waveguides) are very small, such that the total width of the narrower waveguides is substantially similar to the width of the multimode wide waveguide to achieve a good mode matching. This allows the narrower waveguides to capture as much signals coming from the multimode wide waveguide (i.e., all light that enter through the multimode splitter 240) as possible. The larger gap between each narrower waveguide at the splitting part may result bigger splitting loss and. wavelength dependence.

The multimode splitter 120 may split the multimode wide waveguide into any appropriate number of smaller waveguides (e.g., 1×n multimode splitter). It should be appreciated that the splitting ratio of the signals coming from the multimode wide waveguide into the narrower waveguides depends on the original optical modes in the multimode wide waveguide. In some embodiments, the width of each narrower waveguides may be even different. However, having the total width of the narrower waveguides substantially similar to the width of the multimode wide waveguide allows the narrower waveguides to transit the signals coming from the multimode wide waveguide into the detector 250 (also known as a waveguide photodetector).

In the illustrative embodiment, the optical mode in the narrower waveguide is multimode, and the narrower waveguides are made of the same material as the multimode wide waveguide to avoid reflection. However, in some embodiments, the narrower waveguide may be embodied as a single-mode optical fiber and may be made of materials different than the multimode wide waveguide.

As described above, each narrower waveguide is coupled to the detector 250, which monitors light intensity variations of the optical signal. Each photodetector 250 is configured to convert optical filtered signals propagating along the corresponding waveguide to electrical signals. In the illustrative embodiment, the photodetectors 250 are embodied as waveguide photo-diodes (PD), and the waveguide PD may use a PIN junction to increase the speed of response. It should be appreciated that the photodetectors may be implemented on silicon (Si), germanium (Ge), any other suitable substrates, and/or any combination thereof. In some embodiments, the optoelectronic system 200 may further include a controller, which is configured to combine the electrical signals from the one or more detectors 250 to generate an output signal.

Figure 7:
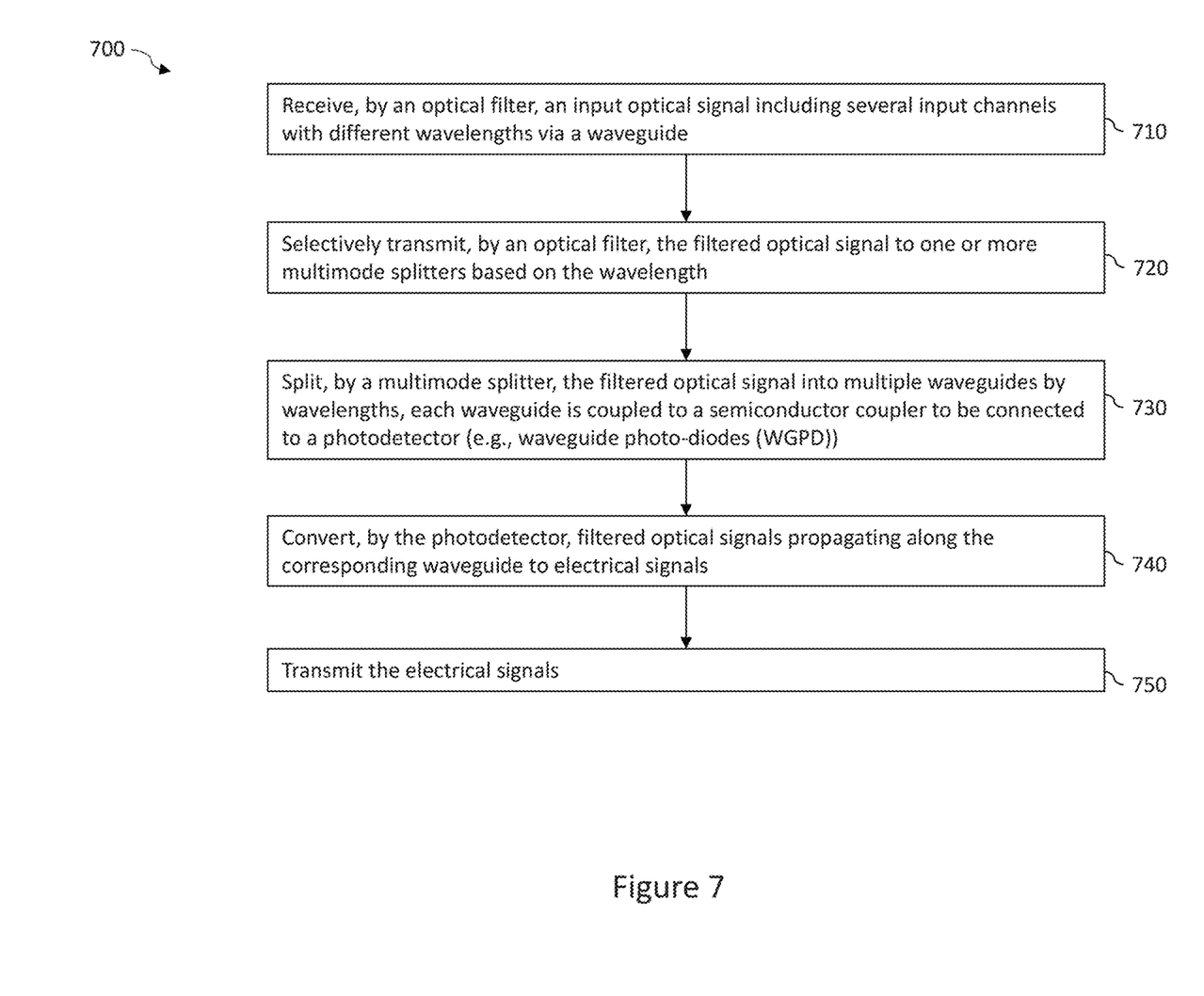
FIG. 7 is a flow diagram illustrating a computer-implemented method for detecting optical signals propagating along a multimode wide waveguide by narrowing an input width for photodetector connections.

Referring now to FIG. 7, a method 700 for detecting optical signals propagating along a multimode wide waveguide by narrowing an input width for photodetector connections in an optical communication system (e.g., the optical communication system 100) is shown. In the illustrative embodiment, the method 700 begins by receiving an input optical signal by an optical filter (e.g., 110), as indicated in block 710. The input optical signal includes a number of optical carrier signals that have been multiplexed onto a single optical waveguide by using different wavelengths. As the input optical signal passes through the optical filter, the optical filter demultiplexes the input signal into different multimode waveguides based on different wavelengths. By doing so, the optical filter may selectively transmit a filtered input optical signal, as indicated in block 720.

The multimode splitter structure is configured to divide the multimode wide waveguide into a narrower input width for photodetector connections. Accordingly, in block 730, the multimode splitter (e.g., 120) splits the filtered optical signal into narrower waveguides. As described above, the total width of the narrower waveguides is substantially similar to the width of the multimode wide waveguide. This allows narrower waveguides to capture as much signals coming from the multimode wide waveguide (i.e., all light that enter through the multimode splitter) as possible and transit the signals from the multimode wide waveguide into a photodetector (e.g., 130).

As indicated in block 740, the photodetector converts the filtered optical signals propagating along the corresponding narrower waveguide to electrical signals. For example, the photodetector may be embodied as waveguide photo-diodes (PD).

Subsequently, the electrical signals is transmitted, as indicated in block 750. For example, in some embodiments, a controller may receive electrical signals from multiple photodetectors and combines the electrical signals to generate an output signal.

The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. An optoelectronic system, comprising:
an optical filter communicatively coupled to a first waveguide to receive an optical signal and configured to demultiplex the optical signal onto a plurality of second waveguides based on different wavelengths, each of the second waveguides having a second width;
a multimode splitter adapted to divide each of the plurality of second waveguides into a plurality of third waveguides having the same width, the same width of each of the plurality of third waveguides being different than the second width; and a plurality of photodetectors, each of the plurality of photodetectors adapted to be connected to a respective one of the plurality of the third waveguides;

wherein an optical mode of each of the plurality of second waveguides is multimode, and an optical mode of each of the plurality of third waveguides is multimode;

wherein the plurality of photodetectors include one or more waveguide photo-diodes (PD) each having a waveguide width smaller than the second width of the second waveguides; and wherein the waveguide width of each of the one or more waveguide photo-diodes (PD) matches the same width of the plurality of third waveguides to support the optical mode being multimode.

2. The optoelectronic system of claim 1, wherein the third width is smaller than the second width.

3. The optoelectronic system of claim 1, wherein a total width of the plurality of the third waveguides is substantially similar to the second width.

4. The optoelectronic system of claim 1, further comprising:

each of the plurality of photodetectors is configured to convert an optical signal propagating along the respective third waveguide to an electrical signal; and a controller configured to receive the electrical signal to generate an output signal.

5. The optoelectronic system of claim 1, wherein each of the plurality of second waveguides is made of silicon, indium phosphide (InP), and/or silica, and each of the plurality of photodetectors is implemented on silicon, indium phosphide (InP), and/or silica.

6. The optoelectronic system of claim 1, further including:

a polarization splitter configured to split the optical signal propagating along the first waveguide into a first transverse electrical (TE) optical signal and a transverse magnetic (TM) optical signal; and a polarization rotator configured to convert the TM optical signal to a second TE optical signal.

7. The optoelectronic system of claim 1, wherein the waveguide width of each of the one or more waveguide photo-diodes (PD) and the same width of the plurality of third waveguides are less than one micrometer.

8. A method for transmitting optical signals, comprising:

receiving, by an optical filter, an optical signal from a first waveguide;

demultiplexing, by the optical filter, the optical signal onto a plurality of second waveguides based on different wavelengths, each of the second waveguides having a second width; and splitting, by a multimode splitter, a signal propagating along each of the plurality of second waveguides into a plurality of third waveguides having the same width, the same width of each of the third waveguides being different than the second width and coupled to a photodetector;

wherein an optical mode of each of the plurality of second waveguides is multimode, and an optical mode of each of the plurality of third waveguides is multimode;

wherein the photodetector includes a waveguide photo-diode (PD) having a waveguide width smaller than the second width of the second waveguides; and wherein the waveguide width of the waveguide photo-diode (PD) matches the same width of the plurality of third waveguides to support the optical mode being multimode.

9. The method of claim 8, wherein the third width is smaller than the second width.

10. The method of claim 8, wherein a total width of the plurality of the third waveguides is substantially similar to the second width.

11. The method of claim 8, further comprising:

converting, by the photodetector, a signal propagating along a first third waveguide of the plurality of third waveguides to an electrical signal;

transmitting, by the photodetector, the electrical signal to a controller; and generating, by the controller, an output signal.

12. The method of claim 11, wherein the generating the output signal includes combining, by the controller, one or more electrical signals from a plurality of photodetectors that are coupled to the plurality of third waveguides.

13. The method of claim 9, wherein the optical signal includes a number of optical carrier signals that have been multiplexed onto the first waveguide by using different wavelengths.

14. The method of claim 9, wherein the multimode splitter is configured to divide each of the plurality of second waveguides into the plurality of third waveguides for photodetector connections.

15. The method of claim 9, wherein each of the plurality of second waveguides is made of silicon, indium phosphide (InP), and/or silica, and the photodetector is implemented on silicon, indium phosphide (InP), and/or silica.

16. The method of claim 9, further comprising splitting, by a polarization splitter, the optical signal propagating along the first waveguide into a first transverse electrical (TE) optical signal and a transverse magnetic (TM) optical signal.

17. The method of claim 16, further comprising converting, by a polarization rotator, the TM optical signal to a second TE optical signal.

18. The method of claim 8, wherein the waveguide width of the waveguide photo-diode (PD) and the same width of the plurality of third waveguides are less than one micrometer.

* * * * *